United States Patent [19]

Edwards

[11] Patent Number: 4,604,778
[45] Date of Patent: Aug. 12, 1986

[54] FILLED CALENDER ROLL AND METHOD OF BUILDING SAME

[76] Inventor: William H. Edwards, Main St., Warner, N.H. 03278

[21] Appl. No.: 778,021

[22] Filed: Sep. 20, 1985

[51] Int. Cl.⁴ .......................... B21B 31/08; B30B 3/00
[52] U.S. Cl. ........................................ 29/123; 29/124; 100/155 R
[58] Field of Search ................. 29/123, 110, 118, 119, 29/124, 132, 148.4 D; 100/155 R

[56] References Cited

U.S. PATENT DOCUMENTS

| | | | |
|---|---|---|---|
| 776,796 | 12/1904 | Perkins | 29/123 |
| 3,367,008 | 2/1968 | Hoge | 29/132 |
| 3,383,749 | 5/1968 | Wilkinson | 29/132 |
| 4,475,275 | 10/1984 | Edwards | 29/110 |

Primary Examiner—Mark Rosenbaum
Assistant Examiner—Irene G. Golabi
Attorney, Agent, or Firm—Ross, Ross & Flavin

[57] ABSTRACT

A method of building a filled roll in the form of a load-carrying shaft and a stack of annular fillings sleeved upon the shaft and an end head sleeved upon the shaft at each opposite end of the stack, includes the steps: concentrating compressive forces on the end heads and the stack therebetween in the axial direction of the shaft and on axially aligned concentric loci defined on the outboard faces of the end heads and radially spaced from and circumadjacent the shaft periphery for precluding end head deformation under the applied compressive forces, the surface area of each end face inboard of the respective locus being equal to the surface area outboard thereof as figured from the area of the fillings of the stack, and with the inner end face of each end head having a negative taper at the interface of the end head and the respective end of the stack.

5 Claims, 8 Drawing Figures

FILLED CALENDER ROLL AND METHOD OF BUILDING SAME

This invention relates to a new and novel method of building a filled roll of the type used in a calender or super calender in paper and textile mills where finishing is involved.

In calendering, two basic categories of rolls are involved: (1) steel rolls which are ground and polished and chrome plated, or for special applications, engraved, and (2) filled rolls with the type of filling depending on the desired finishing effect and the operating temperatures and pressures expected to be encountered.

One type of calender roll consists of a central steel core or shaft and a circumscribing main body of paper or cloth comprised of a stack of fillings or discs sleeved therealong, which stack is compressed by means of a hydraulic ram to define an essentially solid cylindrical form. In roll building, the roll is further provided with opposite metallic end heads held in place by nuts and between which the stack is locked in its state of hard compression. The compressed roll is eventually ground and finished to define a smooth and hard outer periphery.

As long as calender rolls have been built, the building procedure has hardly varied. The paper or cloth fillings have usually been cut into disc or octagon shape and made oversize by as much as ½" over the intended diameter of the finished roll and the end heads outboard of the stack of fillings have been usually dimensioned to conform to the intended diameter of the finished roll.

The apertures or central openings in the fillings have usually been dimensioned so as to provide an 0.030" to 0.035" interference fit of filling to shaft, it being readily acknowledged that, when a roll being built is pressed, hollow spots or spaces commonly occur between filling and shaft.

It is known to pump an epoxy into the hollow spots or spaces between filling and shaft. It has also been known to size the center apertures of the fillings to something smaller than the recommended interference fit, then to prestretch the fillings on a shaft of smaller diameter, then to remove the fillings and place them in their prestretched state on the permanent shaft. Such techniques have offered only mixed results with respct to successful roll building.

According to my invention, I provide fillings which are ½" oversize in outside diameter. That is, they are over the size of the intended diameter of the finished roll. The heads are also oversized in outside diameter by approximately ¼" over and in excess of the outside diameter of the oversized fillings.

Where discs of octagonal configuration may be used, they will be oversized by ¼" measured to the points of the octagon to ensure that all of the filling material is pressed during roll building. Here again, the heads will be oversized in diameter by ¼" over and in excess of the outside diameter of the fillings.

According to earlier techniques, the uncompressed paper or cloth outside of or outboard of the cylindrical plane defined between the peripheral edges of the opposing heads allows a stretching of the paper or cloth away from the shaft with a consequent bunching or crowding at the outer peripheral edge of the filling as compressing ensues.

Contrariwise, in the process hereof, the paper or cloth filling desirably tends to stretch radially inwardly toward the shaft rather than away therefrom.

In the process, the central core or shaft is disposed vertically in a hydraulic press with the shaft projecting upwardly from a piston on which it seats and with a lower steel end head and nuts locked to the lower end of the shaft, all as is normal.

The paper or cloth discs are precut so that their outside diameters are greater than the intended diameter of the finished roll but less than the outside diameters of the opposite end heads. The central openings or apertures of the discs are of the same size as the shaft outside diameter or are slightly oversized.

The discs are grouped in so-called increments so as to be sleeved upon the shaft, an increment at a time, with the building stack being suitably compressed following the strategic placement of each increment. As each increment is so positioned, the upper end head is in turn brought into its sleeved position on the shaft wherefor a compressive force may be exerted thereupon and upon the stack.

When sufficient fillings having been compressed on the shaft to provide the desired proper roll length, the top end is then locked by the end head and nuts on the upper shaft end. The outer roll surface is then machined to provide the desired finished roll diameter.

Final roll diameter conceivably may range between something as small as 6 inches and something as large as 36 inches with an effective working roll length ranging between say 45 and as much as 350 inches.

Actual roll dimensions, diameterwise and lengthwise, are dependent on various factors including the type of service in which it is to be employed, the configuration of the accommodating apparatus in which it is to be mounted, and the type of finish desirably to be attained therewith.

Two types of fibrous material are generally used for filling, one being a non-directional or laminated sheet, the other being a directional sheet. In pressing directional paper, the inside diameter stretches inwardly to the shape of an oval. To offset this, the paper is usually randomly spun. That is, each sheet of the stack is offset from the preceding next adjacent sheet by a few degrees. Such spinning often results in a twisting of the paper column under pressure. If the column is not tight to the shaft, the paper may simply twist as it is pressed. If tight to the shaft so as to prevent the twisting, a residual force results when the roll is locked up and when combined with the interference fit of the paper to the shaft, may cause paper rupture at the core. Rather than resorting to spinning, the sheets are sometimes collated so that each sheet, is placed 90° apart from its preceding sheet, that is to say are alternated between in-machine and cross-machine directions.

Again with reference to the prior art, due to the tremendous forces of axial compression generated, an air cavity is sometimes formed between the filling and shaft having deleterious effects and being harmful to roll function. Worse, any physical elimination of the air cavity can be extremely difficult to achieve.

By my method, the fit of filling to shaft is improved and the air cavity between filling and shaft as referred to is effectively eliminated.

Experimentation has proven that prior art fillings, sleeved upon a shaft and pressed, tend to stretch away from the shaft, ergo my rationale concerning air entrapment. But air evacuation, in and by itself, is not all that is involved in the building of a successful roll.

That experimentation has led further to the technique of controlling the application of the compressive force upon the filling so that that force is applied principally in a locus radially spaced from and circumadjacent the shaft periphery.

Such locus or ring defines the center of gravity through which the generated compressive force is concentrated.

The locus is measured according to the surface area of the discs and is so located that the surface area outboard of the locus is substantially equal to the surface area inboard of the locus.

That is, the loci of the two opposed end heads are in vertical alignment and facilitate the concentration of the applied compressive force along a center of gravity defined by each locus which is radially spaced from and circumadjacent the shaft periphery and along a circular plane vertically aligned with the loci at the opposite end heads where the surface area of the stack outboard of the circular plane is substantially equal to the surface area of the stack inboard of the circular plane.

It is this strategic location of this locus which gives stability to the structure so that the heads or rings will not tilt or deform during compression.

The configuration of the locus is given its definition by an angular disposition of the outboard surface of each end head radially outwardly of that locus. Inboard of the locus, the outboard surface of each end head defines a sharp initial angular disposition which then merges into a horizontal flat area extending radially inwardly to the periphery of the end head central opening. Upon completion of the roll buildup the outer surfaces of each end head may be milled to a flattened surface.

Early testing disclosed deformations in the end heads or rings, due to the intensity of the generated compressive forces so that resort was then made to negatively inclining their inboard faces, that is the inner faces which directly confront the fillings, the inclinations being extended at an angle to the shaft generatrix. The desirable taper in each case was determined to be in the order of between tangent 0.00833 and tangent 0.05000. With such negative tapers, the generated compressive force developed a radially-inwardly-directed component pushing the fillings inwardly toward the shaft while obviating the aforementioned bending of the heads.

Continued development gave rise to the determination that the force should be applied to the end heads and concentrated in a ring or locus. That locus should circumscribe the shaft and should be in vertical alignment with an imaginary circular plane through the filling where the surface area of the filling outboard of that plane would be substantially equal to the surface area of the filling inboard of that plane.

The invention will be more fully described in connection with the accompanying drawings in which.

Figure 1:
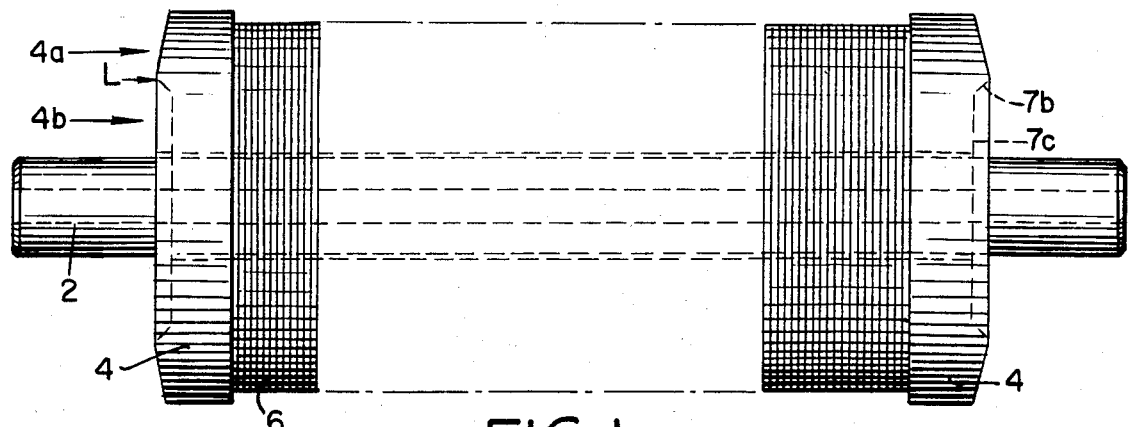
FIG. 1 is a view in side elevation of the filled roll of the invention.
Figure 2:
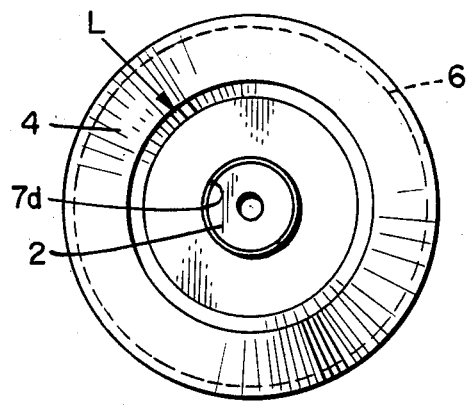
FIG. 2 is an end view of the FIG. 1 roll.
Figure 4:
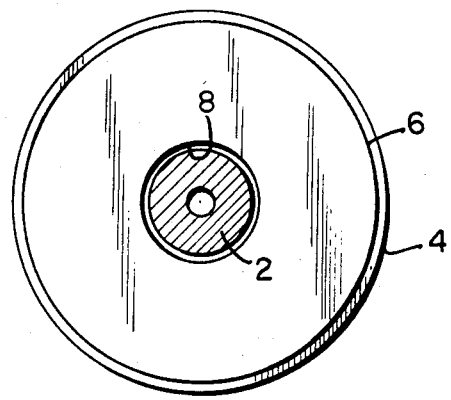
FIG. 4 is a view on line 4—4 of FIG. 3.
Figure 3:
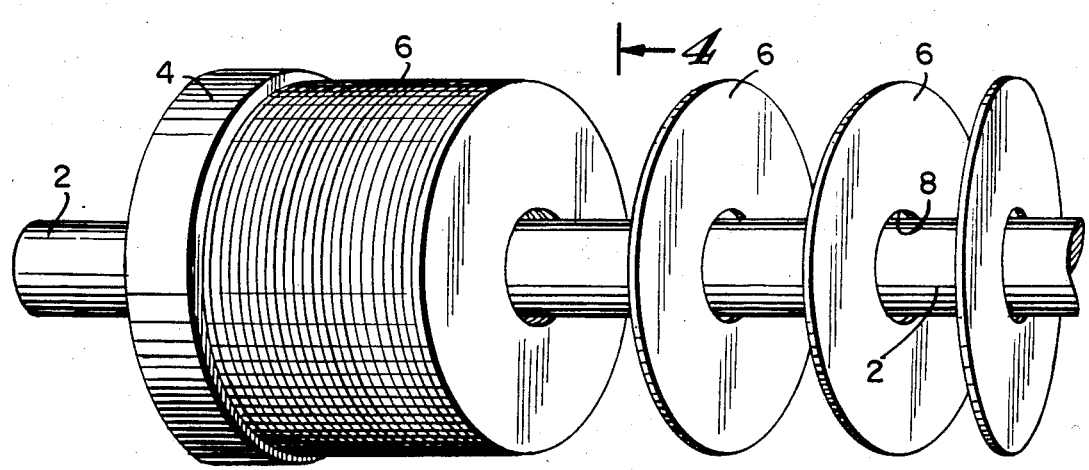
FIG. 3 is an isometric, fragmentary, view of one end of the shaft with fillings being sleeved therealong.

The fillings 6, sometimes called doughnuts, are first died out so that the inside diameter of each is preferably a size for size fit or slightly oversized with reference to the diameter of a supporting shaft 2. The fillings, as shown in FIG. 3, illustrate a slight space between disc opening and shaft periphery, but this is only for purposes of clarity. The inside diameter of each disc will be understood to be preferentially the same as the diameter of shaft 2.

Figure 6:
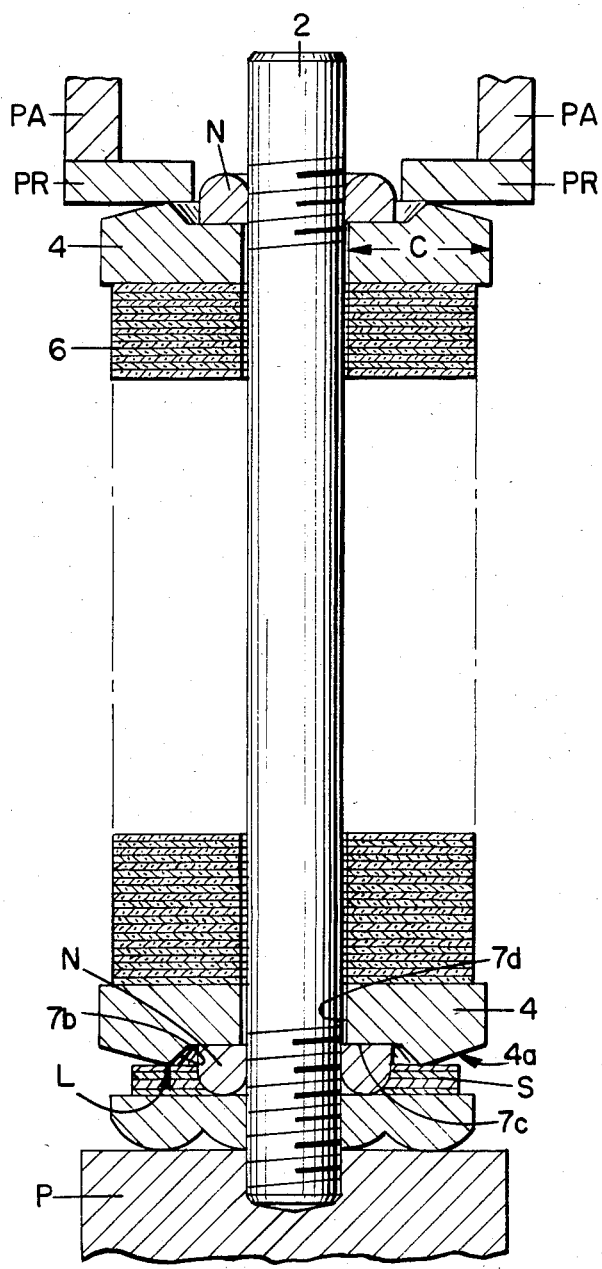
FIG. 6 is a small scale sectional view of a roll under construction showing the roll undergoing building with the fillings in place on the shaft, the opposite end heads in position, and the press piston and press block in compressing positions.
Figure 7:
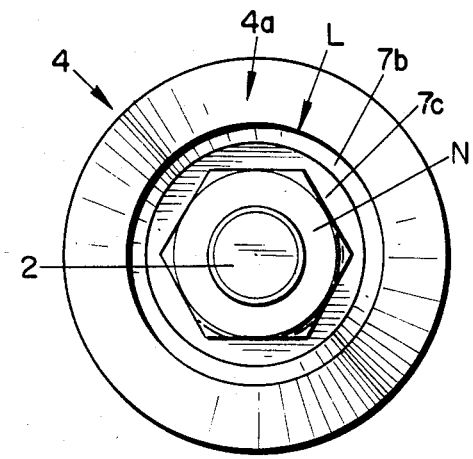
FIG. 7 is a top plan view of a finished roll showing a finished end head.

The discs are sleeved in a stacked relation upon the shaft, as shown in FIG. 6.

In roll building, the roll will be supported vertically upwardly by a piston P on which it seats and a nut N will be threadedly engaged with the shaft to hold same at the lockup pressure.

A lower end head 4 is threadedly engaged with shaft 2 upwardly of nut N and a locking nut 8 is threaded onto the shaft. The end head is spaced from nut N by means of a plurality of shims S sleeved on the shaft and disposed therebetween.

Figure 5:
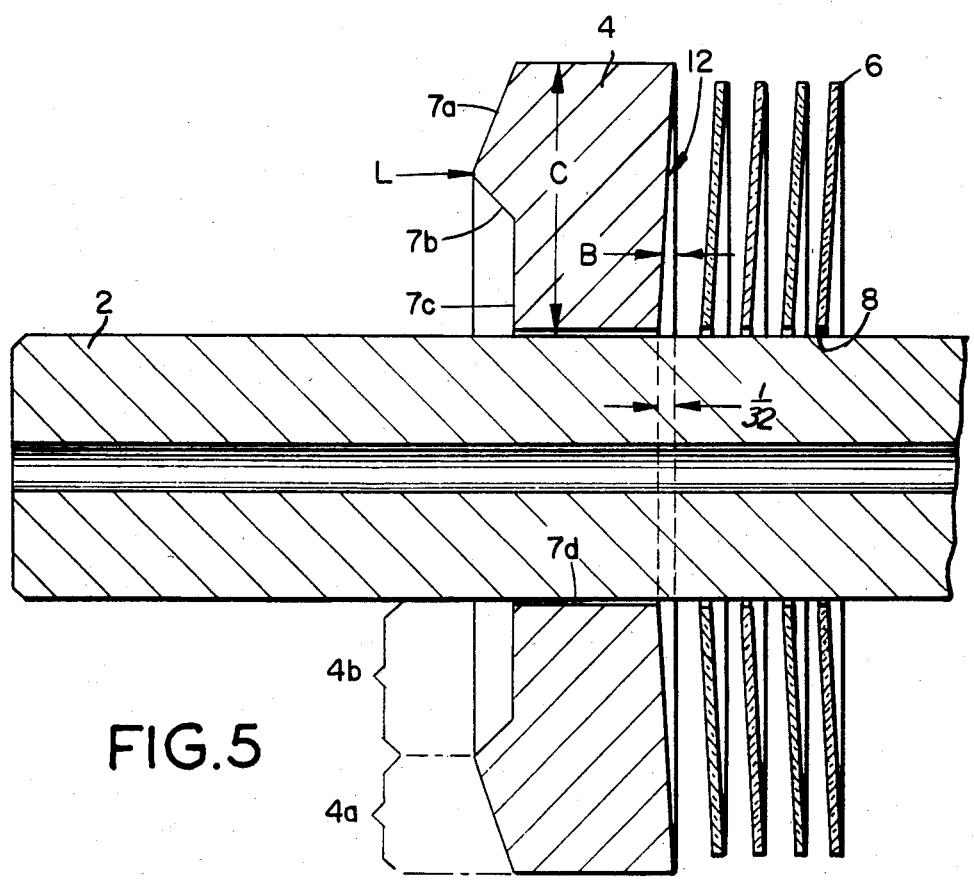
FIG. 5 is an enlarged, fragmentary, sectional view of a roll showing an end head having an inboard face having a negative inclined configuration.

Lower end head is configured so as to define on its outer, lower surface a locus or ring L with the surface area outboard of the locus being denoted 4a and with the surface area inboard of the locus being denoted 4b, as shown in FIG. 5.

The surface area 7a extending radially outwardly of locus L is disposed at an angle from the locus.

The surface area 7b immediately radially inboard of locus L is disposed at a sharp angle from the locus and merges at its other terminus into a horizontal flat surface 7c extending radially inwardly to the central opening 7d of the end head.

Discs 6 are built up upon shaft 2 in small increments, each increment being compressed before a subsequent increment is disposed thereabove.

With each such step in the building, upper end head 4 is placed in position over the stack and a locking nut 8 is positioned thereabove.

A press ring PR is then sleeved upon the shaft and the press arm PA is then brought downwardly into a pressing relationship with the press ring.

Upper end head 2 is similarly configured so as to define on its outer, lower surface the locus or ring L with a surface area 4a outboard of the locus and a surface area 4b inboard of the locus.

The surface area 7a extends radially outwardly of locus L and is disposed at an angle from the locus and the surface area 7b immediately radially inboard of the locus is disposed at a sharp angle from the locus, merging at its other terminus into a horizontal flat surface 7c extending radially inwardly to the central opening 7d of the end head.

Press arm PA is then brought in position to bear against the opposite end head at the loci thereof for the compressing function.

Following each compression of each increment, the press arm is withdrawn and the press ring and nut and upper end head are removed to allow placement of the next increment of discs to be sleeved upon the shaft and on top of the previously compressed fillings of the stack, whereat the press ring and end head and nut are again brought back into position and the next pressing step ensues.

The outside diameter of each end head will be slightly greater than the outside diameter of the discs, as best shown in FIG. 5.

The inboard face 12 of each end head 4 will have a concave lateral surface or negative taper.

The taper will vary according to the density of the filling material in use. The taper should vary from the tangent 0.05000 in the case of materials of least density to the tangent 0.00833 in the case of materials of greatest density. That is, the angle preferentially decreases as the density increases.

By giving the confronting face of each end head this taper or negative inclination, the axial compressive force on the filling will generate a radial component which is directed inwardly toward the shaft. That is, as the discs are compressively stressed by pressure in the direction of the longitudinal axis of the shaft, the pressing faces being inclined with respect to the roll axis will serve to push the fillings inwardly.

The key to success is in the arrangement where the locus is disposed directly over and in vertical alignment with that circular plane through the discs where the surface area of the discs outboard of the circular plane is substantially equal to the surface area of the discs inboard of the circular plane minus a minimal allowance for the force required to overcome the slight frictional force developed by the fillings in their interference fit with the shaft. This force is minimal for the reason that it is a kinetic friction developed during the roll building and becomes a static friction only when the roll is locked up.

I have determined that optimum results are obtained when the taper of the inside and outside surfaces from the ring or locus to the inside diameter and outside diameter respectively is from a point 0.58 times the dimension C in FIG. 5.

Figure 8:
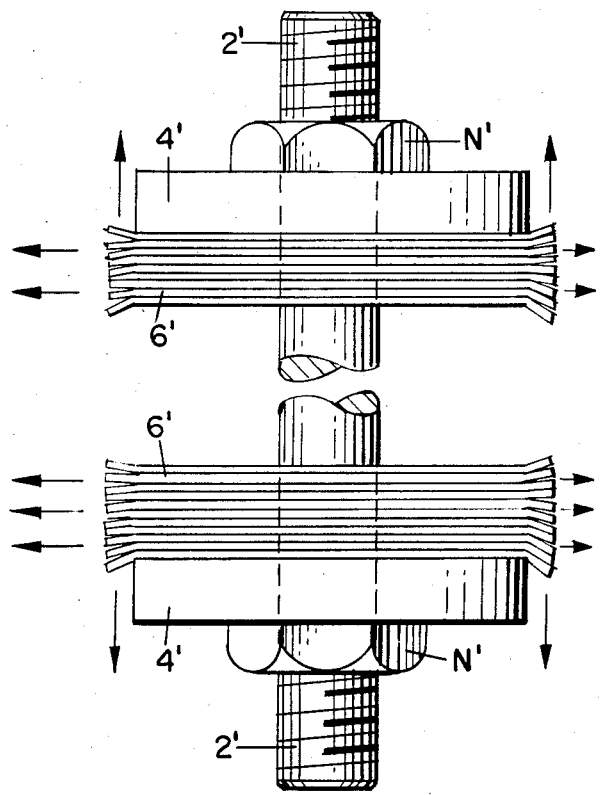
FIG. 8 is a schematic view showing the crowding effect of fillings experienced with prior art roll building techniques.

In FIG. 8, I have dramatized the prior art problem of so-called crowding effect which problem I overcome with this invention.

I eliminate the force at the outside diameter of the fillings causing the crowding effect of the fillings. According to the prior art teachings, two forces are formed: (1) the outward force of the fillings 6' as they seek relief at their outside diameter from the transition from a compressed to uncompressed state, giving the crowding effect, and (2) the normal vertical force or axial load as generated by the compressor.

That is, the uncompressed paper or cloth outside of or outboard of the cylindrical plane defined between the peripheral edges of the opposing end heads 4' allows a stretching of the paper or cloth away from the shaft 2' with a consequent bunching or crowding at the outer peripheral edges of the filling as compression ensues.

I claim:

1. In a filled roll, the combination of a load-carrying shaft,
    a stack of fillings sleeved upon the shaft,
    an end head sleeved on each end of the shaft outboard of and in compressing relationship with the stack,
    with a compressive-force-locating locus located on the outer end face of each end head radially outwardly of and circumadjacent the shaft periphery as defined by angular radially-disposed surfaces on opposite sides of the locus,
    and with the inner end face of each end head having a negative taper at the interface of the end head and the respective end of the stack.

2. A method of building a filled roll consisting of a load carrying shaft and a stack of annular fillings with each filling being preliminarily disposed at 90° to each adjacent filling and sleeved on the shaft between opposite end heads each having a locus on its outboard face and a negative taper on its inboard face and each end head having an outside diameter slightly in excess of the stack outside diameter with the locus defining a circle where the surface area of the fillings outboard of the locus is equal to the surface area inboard thereof, concentrating compressive forces on the loci of the end heads and the stack therebetween in the axial direction of the shaft with the forces being opposite the center of the opposing forces in the stack for the preclusion of end head bending and with the negative taper effecting the converting of some of the compressive forces to an inward directed force vector for overcoming friction of the stack relative to the end heads.

3. In the building of a filled roll comprising the steps:
    sleeving a stack of deformable fillings upon a load-carrying shaft,
    sleeving an end head having an outside diameter slightly in excess of the OD of the stack on each end of the shaft at opposite sides of the stack,
    subjecting the end heads and the stack therebetween to compressive forces concentrated in the axial direction of the shaft and in a locus defined on an outboard surface of each end head and being radially spaced from and circumadjacent the shaft periphery, the end heads additionally having negative tapers at the interfaces of the end heads and the respective ends of the stack for the pushing of the fillings inwardly toward the shaft under the influence of the inward component of the compressive forces.

4. A filled roll consisting of:
    a load-carrying shaft,
    a stack of annular fillings with each filling being disposed at 90° to each filling adjacent thereto and sleeved upon the shaft,
    an end head sleeved upon the shaft at each opposite end of and outboard of the stack,
    each end head having an outside diameter slightly in excess of the outside diameter of the fillings of the stack,
    the outboard face of each end head being configured with a locus radially spaced from and circumadjacent the shaft periphery and defined by angularly-disposed surfaces on opposite sides of the locus radially inwardly inboard and radially outwardly outboard thereof,
    the end heads additionally having negative tapers at the interfaces of the end heads and the respective ends of the stack for the pushing of the fillings inwardly toward the shaft under the influence of the inward component of the compressive forces.

5. In the building of a filled calender roll, the steps of:
    sleeving a first end head having a certain outside diameter on a shaft and a negative taper on its inboard face and a locus on its outboard face representing a plurality of points equally spaced radially from the end head center, sleeving a stack of deformable annular fillings of an outside diameter slightly less than the said certain outside diameter of the end head and disposed alternately in machine and cross machine directions on the shaft inboard of the first end head, sleeving on the shaft inboard of the stack a second end head having the said certain outside diameter and a negative taper on its inboard face and a locus on its outboard face representing a plurality of points equally spaced radially from the end head center, with the opposite loci on the end heads defining an imaginary circular plane extendable therebetween through the fillings of the stack and with the surface area of the fillings inboard of the imaginary circular plane being equal to the surface area of the fillings outboard thereof, applying compressive forces on the loci of the opposite end heads and the stack therebetween in the axial direction of the imaginary circular plane with the center of the opposing forces in the stack being directly opposite thereto for the preclusion of end head deformation and with the negative taper effecting the converting of some of the forces to an inward directed force vector for overcoming friction of the stack relative to the end heads.

* * * * *